UNITED STATES PATENT OFFICE.

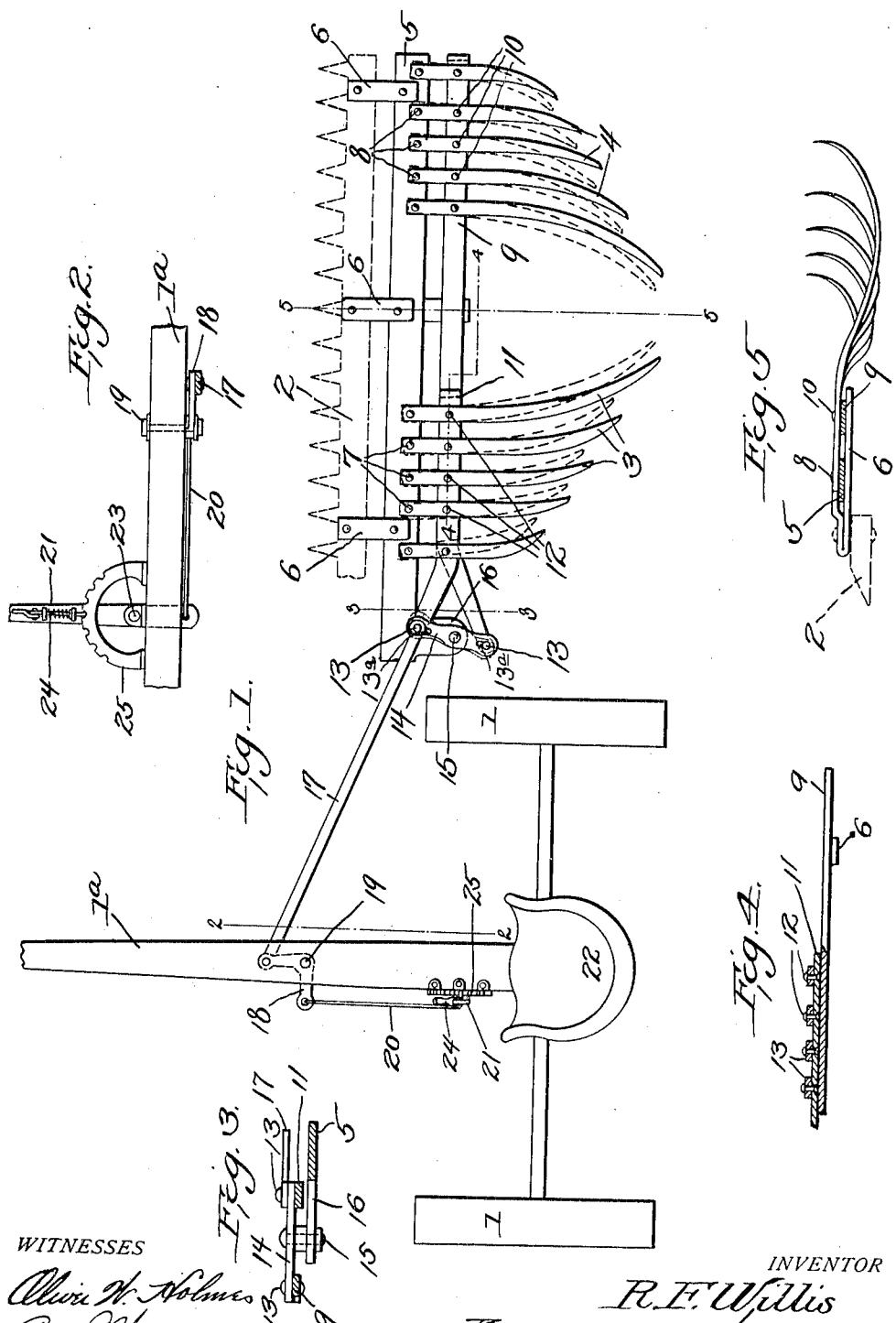

ROBERT F. WILLIS, OF GOTEBO, OKLAHOMA.

WINDROWER ATTACHMENT FOR MOWERS.

1,080,397.  Specification of Letters Patent.  Patented Dec. 2, 1913.

Application filed October 12, 1912. Serial No. 725,462.

*To all whom it may concern:*

Be it known that I, ROBERT F. WILLIS, citizen of the United States, residing at Gotebo, in the county of Kiowa and State of Oklahoma, have invented certain new and useful Improvements in Windrower Attachments for Mowers, of which the following is a specification.

The present invention relates to a windrower attachment for mowers, and has for its object to provide a device of this character which can be readily applied to a mower, and which embodies novel features of construction whereby the two sets of tines can be adjusted toward or away from each other as may be found necessary to obtain the best results.

A further object of the invention is to provide a device of this character which is comparatively simple and inexpensive in its construction, which can be easily manipulated from the seat of the operator, and which will not interfere with the usual operation of the mower.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a plan view of the windrower attachment for mowers, the position of the same being indicated as when applied to a mower. Fig. 2 is a sectional view on the line 2—2 of Fig. 1. Fig. 3 is a detail sectional view on the line 3—3 of Fig. 1. Fig. 4 is a detail sectional view on the line 4—4 of Fig. 1, and Fig. 5 is a transverse sectional view on the line 5—5 of Fig. 1.

Corresponding and like parts are referred to in the following description and indicated in all the views of the drawing by the same reference characters.

Referring to the drawings, the numeral 1 designates a mower which is merely shown diagrammatically, the mower knife carrying bar being indicated at 2. The two sets 3 and 4 of wooden roller tines are carried by a frame bar 5 which extends longitudinally along the rear of the knife carrying bar 2 and is secured thereto in some suitable manner as by means of the straps or braces 6.

The forward ends of the tines 3 are pivotally connected to the frame bar 5 at 7 and, in a similar manner, the forward ends of the tines 4 are pivotally connected to the said bar 5 at 8. The two sets of tines 3 and 4 have the ends thereof curved upwardly and gradually increase in length from the ends of the frame bar 5 toward the middle thereof. It will thus be obvious that these two sets of tines will operate to bring the mown hay toward the center of the device and deposit it in a row in the usual manner.

A tine adjusting bar 9 extends under the two sets of tines 3 and 4 and is pivotally connected at 10 to the various tines 4 at points spaced from the inner ends thereof. A short tine adjusting bar 11 also extends under the tines 3 and is pivotally connected to the same at points spaced from the forward ends thereof, as indicated at 12. These two tine adjusting bars 9 and 11 slide freely over each other and have their extremities pivotally connected to pins 13 which slide in longitudinal slots 13ᵃ in opposite ends of a lever 14, the middle of the said lever being pivoted at 15 to a bracket 16 which projects rearwardly from the frame bar 5. With this construction it will be obvious that when the lever 14 is swung about its central pivot 15, the tine adjusting bars 9 and 11 will be moved longitudinally in opposite directions to swing the two sets of tines toward or away from each other, the movement of the pins 13 within the slots 13ᵃ of the lever 4 allowing proper compensation to be made for the fact that the ends of the levers swing in the arc of a circle. One end of the lever 14 is connected by a forwardly extending and diagonally disposed link 17 to one arm of a bell crank lever 18 which is arranged under the tongue 1ᵃ of the mower and pivotally connected thereto at 19. A rearwardly extending link 20 has the forward end thereof connected to the opposite arm of the bell crank lever 18, the rear arm of the said link being connected to a lever 21 which is arranged adjacent to the operator's seat 22. This lever is pivoted at 23 and is provided with the usual latch 24 adapted to engage the segmental rack 25.

With the foregoing construction it will be obvious that by manipulating the operating lever 21, the bell crank lever 18 can be swung about its pivot 19, and motion transmitted from the said bell crank lever through the link 17 to the lever 14. As this lever 14 is swung about its central pivot 15, the tine operating bars 9 and 11 will be moved longitudinally in opposite directions so as to throw the two sets of tines 3 and 4 either toward or away from each other, as may be found desirable. The two sets of tines can thus be adjusted so as to operate in the most effective manner upon the hay, and this adjustment can be brought about by the operator without the necessity of dismounting from the mower or even stopping the same.

Having thus described the invention, what I claim as new and desire to secure by Letters Patent, is:—

1. A windrower attachment for mowers including a frame bar adapted to be applied to the knife carrying bar of the mower, two sets of tines pivotally connected to the frame bar, a lever carried by the frame bar and pivotally mounted between the ends thereof, and tine operating bars pivotally connected to the respective sets of tines and also connected to opposite ends of the before mentioned lever so that the two sets of tines can be moved toward and away from each other by manipulating the lever.

2. A windrower attachment for mowers including a frame adapted to be applied to the knife carrying bar of a mower, two sets of tines pivotally connected to the frame bar, a main operating lever upon the body portion of the mower, and an operative connection between the said lever and the two sets of tines for moving the said two sets of tines toward and away from each other.

3. A windrower attachment for mowers including a frame bar adapted to be applied to the knife carrying bar of a mower, two sets of tines pivotally connected to the frame bar, a lever pivotally mounted between its ends and carried by the frame bar, tine operating bars pivotally connected to the respective sets of tines and also connected to opposite ends of the lever, a main operating lever upon the body of the mower, and an operative connection between the said main operating lever and the lever carried by the frame bar whereby the latter lever can be moved to swing the two sets of tines toward and away from each other.

4. A windrower attachment for mowers including a frame bar adapted to be applied to the knife carrying bar of a mower, two sets of tines pivotally connected to the frame bar, a lever pivotally mounted between its ends and carried by the frame bar, tine operating bars pivotally connected to the two sets of tines and connected to opposite ends of the said lever, a bell crank upon the tongue of the mower, a link between one arm of the bell crank and the before mentioned lever, a main operating lever upon the tongue of the mower, and a link between the opposite arm of the bell crank lever and the said main lever whereby when the said main lever is moved the lever carried by the frame bar is also moved to swing the two sets of tines toward or away from each other.

In testimony whereof I affix my signature in presence of two witnesses.

ROBERT F. WILLIS.

Witnesses:
F. D. LUCAS,
W. H. HASTY.

---

Copies of this patent may be obtained for five cents each, by addressing the "Commissioner of Patents, Washington, D. C."